United States Patent
Kozora

Patent Number: 5,876,475
Date of Patent: *Mar. 2, 1999

[54] GLASS CONTAINER FORMING PROCESS AND EQUIPMENT

[75] Inventor: Joseph W. Kozora, Saxonburg, Pa.

[73] Assignee: Quantum Engineered Products, Inc., Saxonburg, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 860,281

[22] PCT Filed: Apr. 18, 1997

[86] PCT No.: PCT/US97/06639

§ 371 Date: Jun. 9, 1997

§ 102(e) Date: Jun. 9, 1997

[87] PCT Pub. No.: WO97/39988

PCT Pub. Date: Oct. 30, 1997

Related U.S. Application Data

[60] Provisional application No. 60/015,342 Apr. 19, 1996.

[51] Int. Cl.⁶ .............................. C03B 9/14; C03B 9/20; C03B 9/36
[52] U.S. Cl. .......................... 65/68; 65/72; 65/77; 65/81; 65/261; 65/263; 65/362; 137/625.68; 137/625.48
[58] Field of Search .................................. 65/68, 72, 77, 65/78, 81, 233, 234, 261, 263, 362; 137/625.66, 625.68, 625.48

[56] References Cited

U.S. PATENT DOCUMENTS

| | | |
|---|---|---|
| 1,673,747 | 6/1928 | Howard . |
| 2,471,369 | 5/1949 | Garwood . |
| 2,648,168 | 8/1953 | Rowe . |
| 2,826,867 | 3/1958 | Nava, Jr. et al. . |
| 2,861,397 | 11/1958 | Morel . |
| 3,171,728 | 3/1965 | Anderson . |
| 3,171,729 | 3/1965 | Anderson . |
| 3,171,732 | 3/1965 | Anderson . |
| 3,258,321 | 6/1966 | Wiley . |
| 3,272,612 | 9/1966 | Hamilton . |
| 4,518,409 | 5/1985 | Monden . |
| 4,657,048 | 4/1987 | Foster . |
| 5,358,543 | 10/1994 | Kozora . |

Primary Examiner—Steven P. Griffin
Attorney, Agent, or Firm—Webb Ziesenheim Bruening Logsdon Orkin & Hanson, P.C.

[57] ABSTRACT

A method and apparatus for forming a glass container in a blow-and-blow process. The apparatus includes an air flow controller having a housing defining a chamber, a piston disposed for reciprocal movement from a first position to a second position within the housing for moving a slide block therein, first and second passages extending through the slide block, a first port in the housing in flow communication with the second passage and a transducer when the piston is in its second position to create a negative air flow through the second passage and first port when a pressurized air flow is induced through the transducer to draw a vacuum beneath a gob in a blank mold to form a finish in the gob and sweep debris away from the gob and blank mold, and a second port in communication with the first passage and first port when the piston is in its first position to provide pressurized air to the gob.

13 Claims, 7 Drawing Sheets

PRIOR ART

CONVENTIONAL BLOW & BLOW WITH FUNNEL

| BLANK CLOSE 1 | GOB LOAD 2 | GOB IN BLANK 3 | BOTTLE ON FUNNEL 4 | SETTLE BLOW 5 | BOTTLE OUT FUNNEL IN BOTTLE IN 6 |
|---|---|---|---|---|---|
| PULL BACK AND REHEAT 7 | COUNTER BLOW 8 | INVERT 9 | PUFF 10 | REVERT 11 | |

CONVENTIONAL BLOW & BLOW WITHOUT FUNNEL

| BLANK CLOSE 1 | GOB LOAD 2 | GOB IN BLANK 3 | VALVED BOTTLE IN BLANK 4 | SETTLE BLOW 5 | PULL BACK AND REHEAT 6 |
|---|---|---|---|---|---|
| COUNTER BLOW 7 | INVERT 8 | PUFF 9 | REVERT 10 | | |

FIG. 13

| BLANK CLOSE 1 | GOB LOAD 2 | GOB IN BLANK 3 | VACUUM OF FINISH 4 | PULL BACK AND REHEAT 5 | COUNTER BLOW 6 |
|---|---|---|---|---|---|
| INVERT 7 | PUFF 8 | REVERT 9 | | | |

GLASS CONTAINER FORMING PROCESS AND EQUIPMENT

BACKGROUND OF THE INVENTION

This application claims the benefit of U.S. Provisional Application No. 60/015,342, filed Apr. 19, 1996 and is the National Stage of International Application No. PCT/US97/06639, filed Apr. 18, 1997.

In the commercial production of glass containers by use of an I.S. machine, it is common to employ what is known in the industry as the "blow-and-blow" process for sequentially forming glass containers. A vertically-oriented plunger mechanism is used in combination with a blank mold to achieve initial shaping of a glass parison. The parison is a deformable gob of molten glass which is dropped, vertically downward, into the cavity of the blank mold whereupon pressurized air is applied downward onto the parison to cause it to conformably fill the lower portion of the blank mold cavity. The foregoing step in shaping the parison is commonly referred to as the "settle blow".

At the lower end of the blank mold is a neck ring for shaping what will become the container lip end or neck. Immediately following the aforementioned settle blow, an upwardly directed pressurized air flow or "counter blow" is directed through the neck ring to cause the parison to fill out the blank mold cavity and assume the general shape of a glass container.

During the initial downward insertion of the parison into the blank mold, a funnel is normally disposed at the upper end of the blank mold to facilitate entry of the parison into the mold, after which the funnel is replaced by a baffle to close off the upper end of the blank mold except for air channels through the baffle which direct the downward pressurized air flow during the settle blow step. The baffle remains in place during the upward counter blow, and the counter blow results in the full shaping of the parison. Following the counter blow step of the blow-and-blow process, a mechanical transfer of the formed parison occurs, moving it from the blank mold to an adjacent blow mold where reheating and final forming of the parison to the desired container shape, consistent with the blow mold cavity, occurs.

An inherent problem in the use of the blow-and-blow process is the continued formation of glass particulate debris in the area of the neck ring. Such debris becomes entrained in the air flow and may become embedded in the parison or form a buildup in the air flow channel of the plunger mechanism. Another inherent problem in the blow-and-blow process, particularly in the production of narrow neck containers, is the inability to consistently produce glass containers free of settle wave and with uniform lightweight glass distribution in the container. This problem has usually been addressed in the industry by using equipment specifically designed to produce containers by a process known as "NNPB", or narrow neck press and blow.

Obtaining the speed, efficiency, and product consistency of the NNPB process through an improved blow-and-blow process has continued to be a goal which has until now eluded glass container manufacturers.

SUMMARY OF THE INVENTION

The present invention addresses the foregoing problems and presents an improved blow-and-blow process for the initial molding of a parison in a blank mold wherein the settle blow step of the process is considerably more efficient, and the removal of particulate debris is constant and in a direction always away from the parison whereby the number of flawless containers formed in the operation of the I.S. machine is significantly increased.

More specifically, the present invention provides for utilization of a vacuum within the throat or air flow tube structure of the plunger mechanism of the I.S. machine, during the sequential steps of the blow-and-blow process, whereby initial shaping of the parison in the blank mold is more positive and consistent and is accompanied by air sweep debris removal in a direction away from the parison.

The vacuum step of the process herein disclosed is preferably practiced in combination with a plunger mechanism in an I.S. machine which has the improved internal tube structure as disclosed in U.S. Pat. No. 5,358,543. Such structure provides a relatively smooth air passage surface and eliminates interfering ledges and seals which in the prior art acted as entraining surfaces for particulate debris carried by the air flow.

The means of creating a momentary negative pressure, or vacuum, on the down side of the parison during the blow-and-blow operation is facilitated by the use of a transducer device adapted to utilize pressurized air flow to create suction by aspiration from the central tube structure of the plunger mechanism at the appropriate instant in the blow-and-blow cycle. By use of the transducer, vacuum is induced at a location immediately adjacent the plunger mechanism, obviating the need for a remotely located suction pump, and the same compressed air source that is used currently to press the parison downward during the settle blow step of the bottle forming cycle and to impart the upward pressurized air flow during counter blow can be momentarily channeled through the transducer to evacuate the central tube structure of the plunger mechanism as a incident of the counter blow.

The invention disclosed herein comprehends a unitized valve structure which serves as an air flow controller or converter and includes a transducer assembly or vacuum sleeve which acts to convert a positive air flow pressure to a negative air flow whereby a partial vacuum is drawn, in accordance with a timed sequence, in the throat or tube structure of the plunger mechanism of the I.S. machine.

BRIEF DESCRIPTION OF THE ACCOMPANYING DRAWINGS

FIG. 1 is a vertical sectional view illustrating the first step in forming a parison into a container;

FIG. 2 is a view similar to FIG. 1 but illustrating a parison having undergone the settle blow in a blank mold; and FIG. 3 is a view similar to FIGS. 1 and 2 but illustrating the parison after it has undergone the counter blow of the blow-and-blow process.

DETAILED DESCRIPTION OF THE PREFERRED EMBODIMENTS

Figure 1:
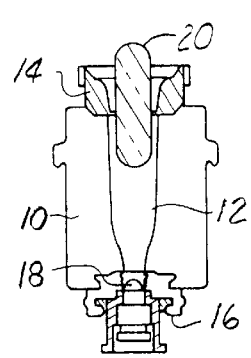
FIGS. 1–3 are illustrations of the initial delivery and forming of a glass parison in a blank mold. More specifically.
Figure 2:
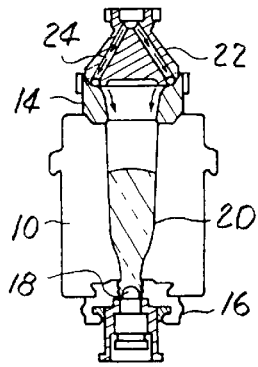
Figure 3:
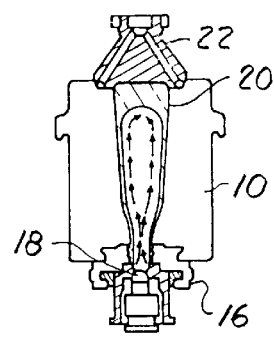

FIGS. 1, 2, and 3 illustrate successive steps in the blow-and-blow cycle which is utilized to form a molten gob or parison into an initial glass container shape. Each of these figures shows a blank mold 10 having a vertically-oriented cavity 12. FIG. 1 shows a funnel 14 positioned at the upper end of the cavity 12 to receive and guide a parison 20 downward into the cavity 12. A neck ring 16 is disposed at the lower end of the cavity 12 and has a vertically-reciprocal plunger 18 projecting therein.

FIG. 2 shows a baffle 22 which is positioned on the funnel 14 after the parison 20 is deposited into the cavity 12 as shown in FIG. 1. The baffle 22 has passages 24 enabling compressed air to be injected downward into the cavity 12 to cause the parison 20 to fill the lower end of the cavity 12. The applied air acts to "settle" the gob into the finish and form the container lip end or neck in conformance with the shape of the neck ring. On completion of the blank shape as shown in FIG. 2, the air flow is terminated. After sufficient settling time, the baffle 22 is removed to allow the funnel 14 to be withdrawn whereby the baffle is again positioned on the blank as shown in FIG. 3 where it serves to seal the upper end of the blank mold.

The plunger 18, which was utilized in an upward stroke position to form the container throat, is moved downwardly as shown in FIG. 3, and air is blown upwardly into the parison to form the glass to the shape of the blank. After completion of the sequential steps shown in FIGS. 1–3, mechanical means is utilized to move and invert the parison from the blank mold to a blow mold (not shown) where the parison is finally formed to the finished container shape by the further application of compressed air into the parison.

The entire forming operation, beginning with the parison as shown in FIG. 1 and ending with the formed container in the blow mold, is commonly referred to in the industry as the "blow-and-blow" process. Hence, FIGS. 1–3 are illustrative of the first "blow" cycle of the "blow-and-blow" process.

Figure 4:
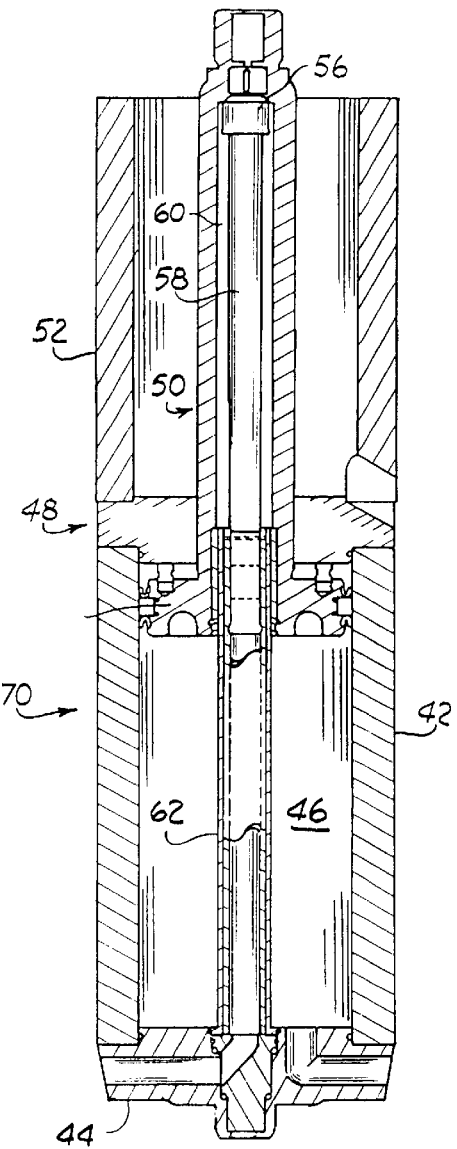
FIG. 4 is a view in vertical section illustrating the internal structure of certain glass container forming equipment commonly referred to as a "plunger mechanism" in accordance with the present invention.

FIG. 4 (and also FIG. 10) illustrates a plunger cycling mechanism 40 for an individual section glass container forming machine, having a cylinder casing 42 defining a chamber 46. The cylinder base or bottom is an end cap 44, and the upper end of the cylinder is defined by an intermediate cap 48. Extending axially upwardly through the chamber 46 is a piston having an annular lower end or base 54 and a rod portion 50. The piston is adapted for air driven linear vertical movement to cycle a plunger 18 (FIG. 1) in a glass container forming operation which utilizes a blank mold 10 positioned at the upper end of the plunger mechanism. A casing section 52 disposed above the cylinder 40 serves to contain the plunger and other elements. Not shown in FIG. 4 are seals and bearings which would be supported by the intermediate cap 48, about the rod portion 50, to facilitate its reciprocal operation. For details of such structure and for a more thorough understanding of the operation of an individual section machine generally, reference may be made to U.S. Pat. No. 1,911,119; 2,508,890; 2,702,444; or 2,755,597.

FIG. 4 also illustrates air tube structure within the plunger mechanism 40, including a first tube or tubular member 58, the upper end of which is secured within the upper end of the rod portion 50 by a connecting member 56. Between the inside wall surface of the rod portion 50 and the tube 58 is an annular space 60, and contained within the annular space 60 is a second tube or tubular member 62 which projects separately from the inward surface of the end cap 44.

Figure 5:
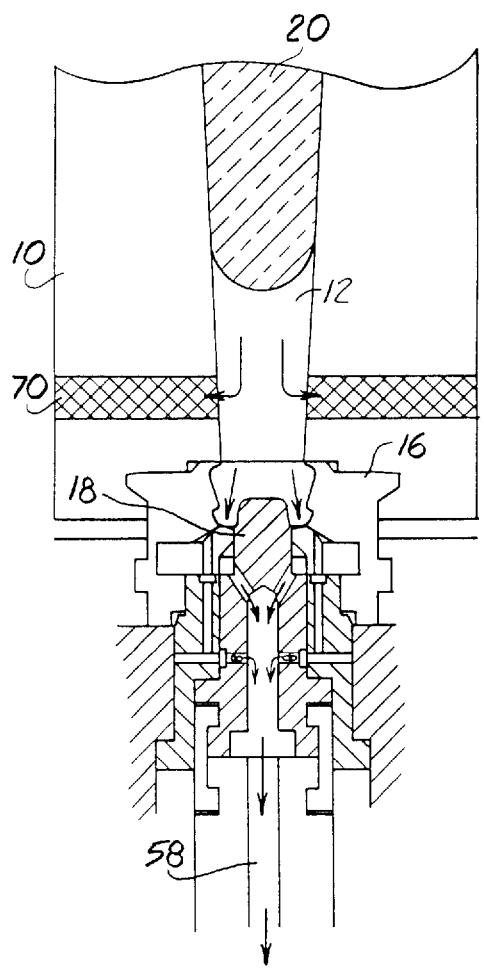
FIG. 5 is a fragmentary view in vertical section illustrating the upper end of a plunger mechanism as shown in FIG. 4 but in operative mated combination with a blank mold, and having the components positionally disposed as they appear during parison gob loading of the blank mold.
Figure 6:
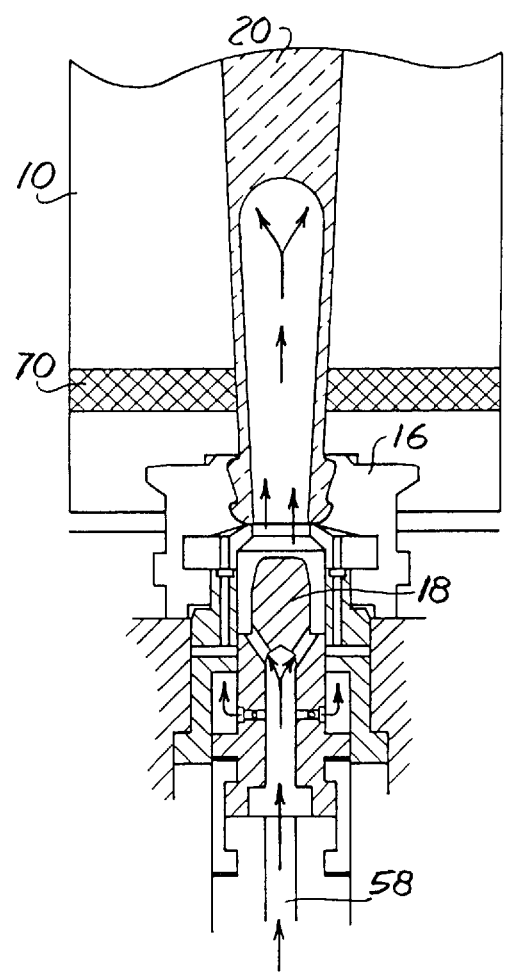
FIG. 6 is a fragmentary vertical sectional view of the same components shown in FIG. 5 and illustrating a relative component positioning during the counter blow step in a blow-and-blow container forming operation.
Figure 7:
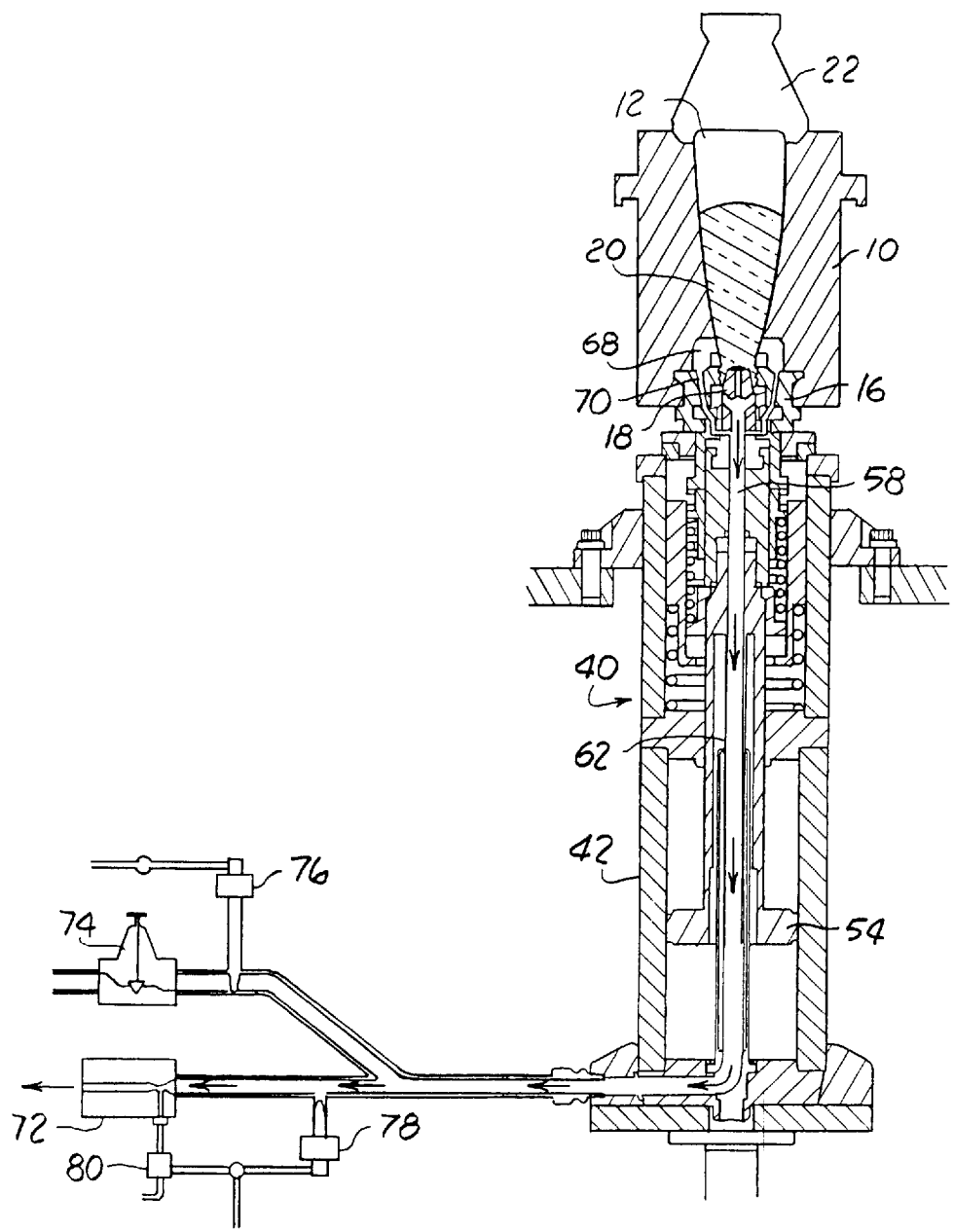
FIG. 7 is a view in vertical section illustrating a plunger mechanism of the type first shown in FIGS. 5 and 6 but providing greater detail of the structure and its mated blank mold, and a transducer in combination therewith for inducing a vacuum in the internal tubing structure of the plunger mechanism in accordance with the method of the present invention.
Figure 8:
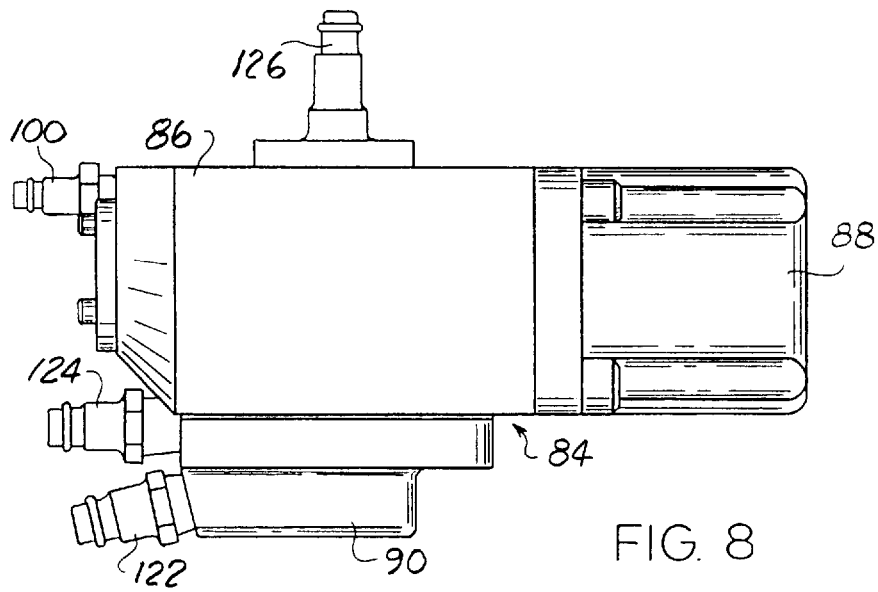
FIG. 8 is a side elevational view of an air flow control device for use in practicing the process or method introduced by the present invention.
Figure 9:
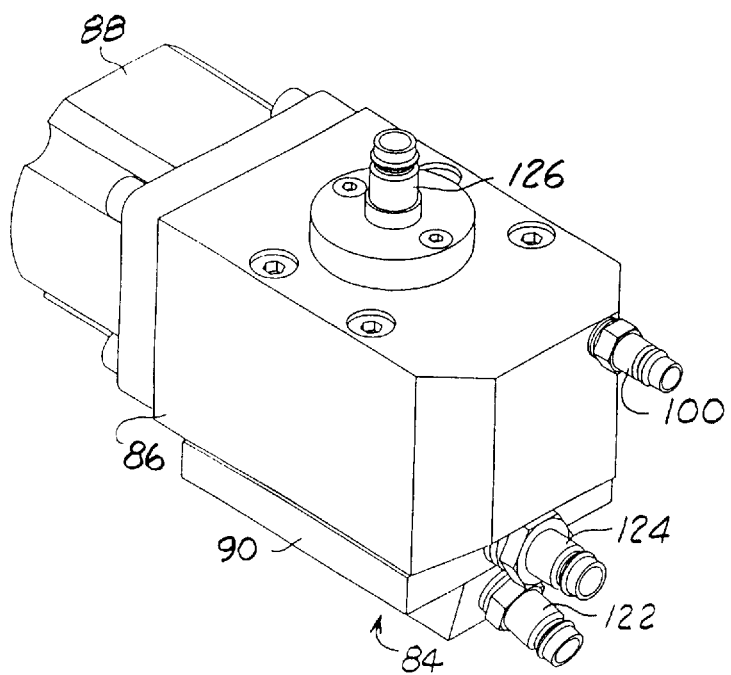
FIG. 9 is an isometric view of the air flow controller device first shown in FIG. 8 but here shown on a smaller scale and taken from a viewpoint facing toward the hidden corner at the left end of the structure first shown in FIG. 8.

FIGS. 5, 6, and 7 illustrate the various structural modifications of a plunger mechanism assembly which are consistent with the practice of the improved blow-and-blow process of the present invention. In all three figures, arrows are used to indicate air flow direction during the improved blow-and-blow process, as hereafter further explained.

FIG. 5 corresponds generally to the parison insertion step shown in FIG. 1. Laterally-directed ports 68 are shown in the blank mold 10 in FIG. 5 to enable expulsion of air from the cavity 12 as the parison enters the cavity 12. Although such exhaust ports are commonly used in the prior art, provision is made in the structure of the present invention for the ports 68 to lead downwardly and communicate with air passages 70 provided in the body of the neck ring 16, leading to the central tube 58, as shown in FIG. 7. FIG. 7 also shows the provision of a transducer or venturi means 72 placed in air flow communication with the tube-within-a-tube structure (tubes 58 and 62) axially disposed within the plunger mechanism 40. Elements 74, 76, 78, and 80 represent valve means for reversing air flow direction to the tube structure of the plunger mechanism. It has been experimentally established that the vacuum effect which is critical to the practice of the disclosed process may be greatly enhanced without changing the diameter of the air flow piping by utilizing a pair of vacuum transducers placed in parallel disposition for creating the evacuation illustrated in FIG. 5.

The process of the present invention relates to the utilization of vacuum-assist during the initial insertion of the parison into the blank mold cavity, and completing or eliminating the settle blow step of the blow-and-blow process by continued application of vacuum in combination with pressurized air to push the parison into the neck ring at the lower end of the blank mold, and then reversing the air flow to force the parison to conform to the blank mold cavity and assume the intial glass container shape. The foregoing is a sequential timed sequence of events which also includes vacuum cleaning of glass particulate debris and any other contaminants through the central tube structure of the plunger mechanism so that such debris is not embedded in the parison.

In the preferred embodiment of the apparatus of the invention, the lateral ports or vents 70 which serve to permit evacuation of air from the cavity 12 become closed off by the parison as it moves into the lower end of the cavity 12, however, air passages are provided at the base of the plunger 18 to allow suction applied in the tube 58 to effectively increase the downward air pressure and force the parison firmly into the neck ring 16. FIGS. 5 and 7 illustrate the direction of air flow as the vacuum is drawn, and FIG. 6 illustrates the application of pressurized air during the counter blow step.

It is also comtemplated that a central air passage or throat be provided through the plunger 18 as shown in FIG. 7. Further, construction of the plunger body or its outer surface may be of a ceramic material to retard heat transfer between the plunger and the parison whereby container formation becomes more uniform.

Figure 10:
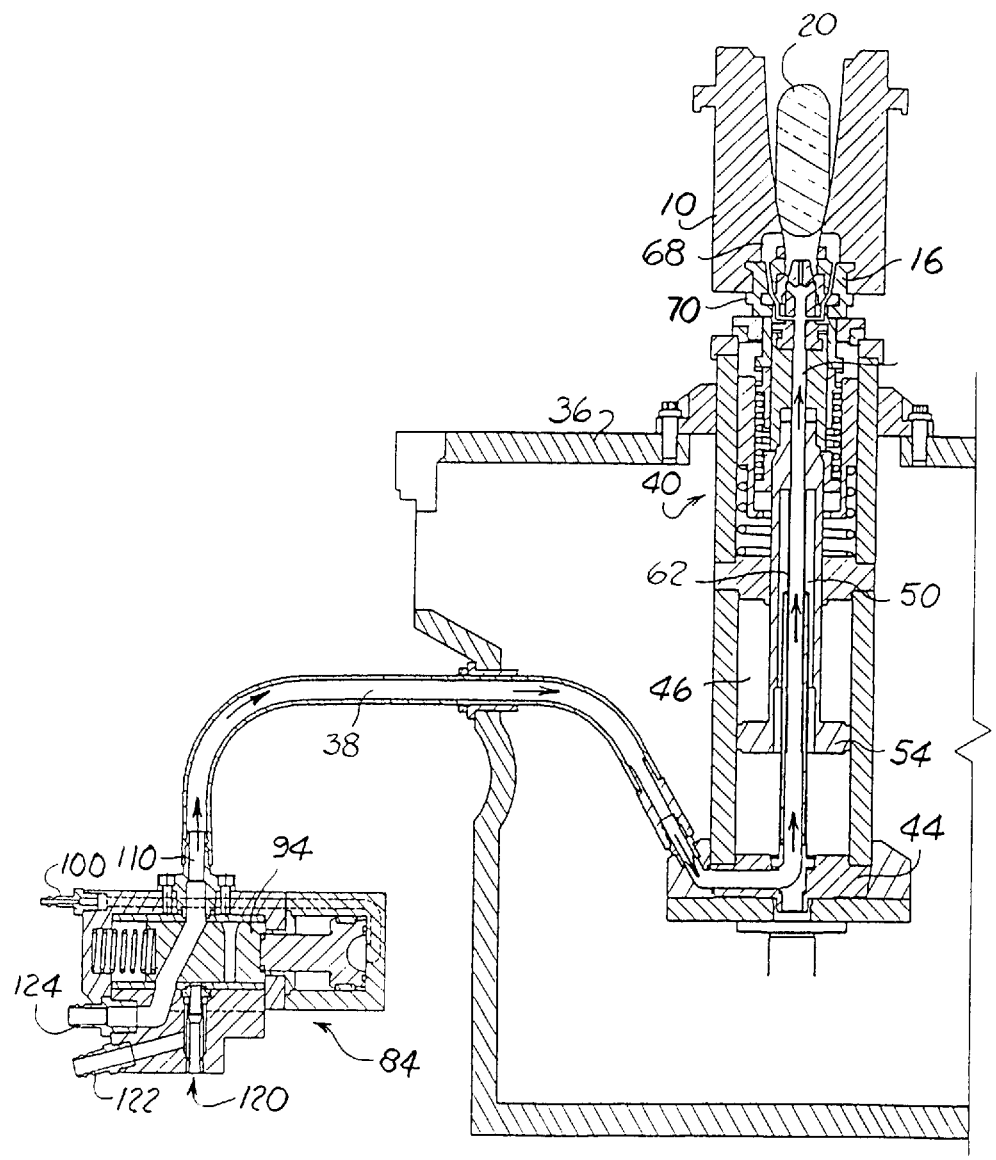
FIG. 10 is a view in vertical section of a plunger mechanism of the type first shown in FIG. 4 in combination with an air flow control device of the type first shown in FIG. 8.
Figure 11:
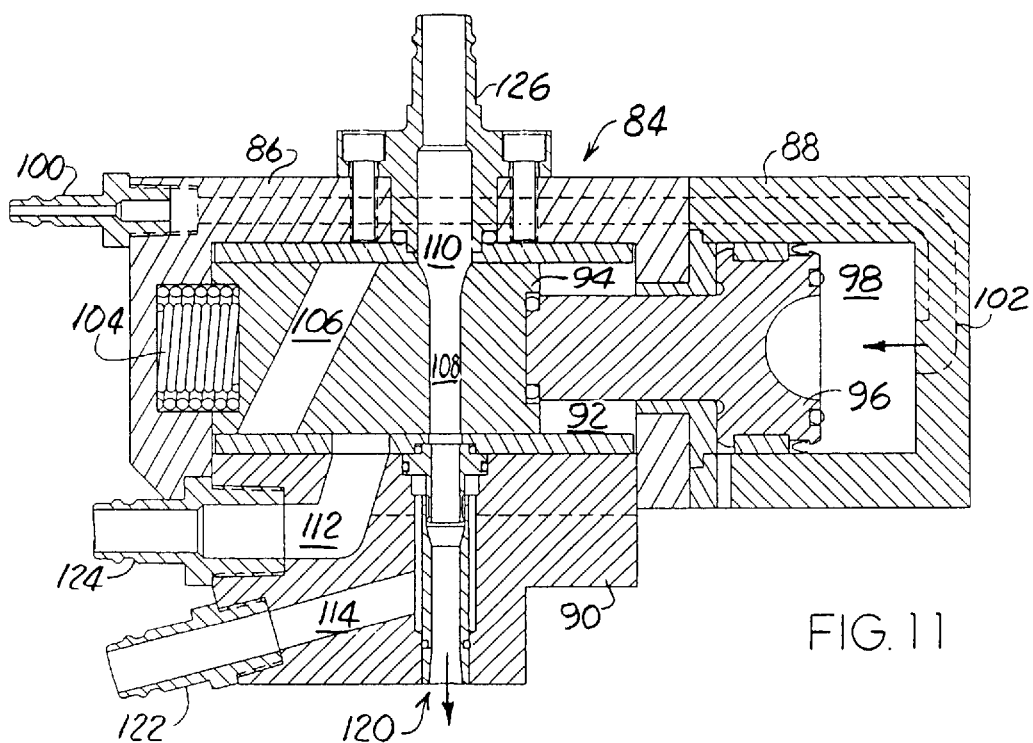
FIG. 11 is a view in vertical section of the air flow control device of the present invention first shown in FIGS. 8–10 but here shown substantially in full scale.

The air flow controller device, or controller 84, shown in FIGS. 8–11, comprises a rigid main body portion 86, a secondary body portion 88, and a bottom cover portion 90. With reference to FIG. 11 it will be seen that the main body portion 86 defines an inner rectilinear chamber 92 in which a slide block member 94 is mounted for reciprocal movement along a linear pathway and between a first position shown in FIG. 10 and a second position shown in FIG. 11. Slidably mounted within the secondary body portion 88 is a piston 96 which serves to drive the slide block 94 to the position shown in FIG. 11 in response to a pressurized air flow directed into a piston chamber 98.

Pressurized air is the main source of energization for forming system equipment. Suitable air lines and valves (not shown) are provided to direct compressed air to operate the plunger mechanism 40 and to direct an air stream into the mold 10 to accomplish the blow-and-blow process container forming operation. A mechanical or electronic timing system well known in the prior art (not shown) is used to operate the valves in a timed pre-selected sequence to cycle the equipment and form each container.

Referring again to FIG. 11, an air hose (not shown) is coupled to a male coupler 100 which is in flow communication with an air passage 102 leading to the chamber 98. When a pressurized air flow is directed into the chamber 98, and the piston 96 is disposed in the position shown in FIG. 10, the piston 96 is caused to shift along a linear pathway to the left shown in FIG. 11 whereby it pushes slide block 94 from the position shown in FIG. 10 to its second position shown in FIG. 11. At the end of the slide block 94 opposite the piston 96, a compression spring 104 is mounted to be compressed by the movement of the slide block 94 so that, when the pressurized air flow to the chamber 98 is curtailed, the spring 104 will urge the slide block 94 and the piston 96 back to the first position as shown in FIG. 10.

The slide block 94 of the controller 84 and the cover portion 90 are provided with internal air flow passageways 106, 108, 112, and 114. When the slide block 94 is disposed within the chamber 92 at its normal position as shown in FIG. 10, the oblique passageway 106 through the slide block 94 is in sealed alignment with air flow passages 112 and 110 whereby pressurized air may be conducted through the male coupler, 124 of the controller 84 and thence to the plunger mechanism 40 as also shown in FIG. 10.

FIG. 10 illustrates a section box 36 of an I.S. machine wherein a plunger mechanism 40 is operationally mounted. The vertical throat of the plunger mechanism 40, comprising central air tube structure made up of tube 58 and tube 62, is interconnected through the base plate 44 with an air line 38 leading to male coupler 126 of the air flow controller device 84. The device 84 may be stationarily mounted on the side of the section box although it is not shown in that disposition in FIG. 10.

The air flow controller 84, when it is sequentially triggered during the parison forming cycle, undergoes a shift of its slide block 94 from the position shown in FIG. 10 to that which is shown in FIG. 11 whereby the transverse passageway 108 in the slide block 94 moves into sealed communication between port or passageway 110 and the central bore of the transducer 120. The means of inducing the shift of the slide block 94 between its two positions may, alternatively, be an electrically energized solenoid installed in the second body portion 88 and adapted to drive the piston 96 at the appropriate instant during the blow-and-blow cycle.

Figure 12:
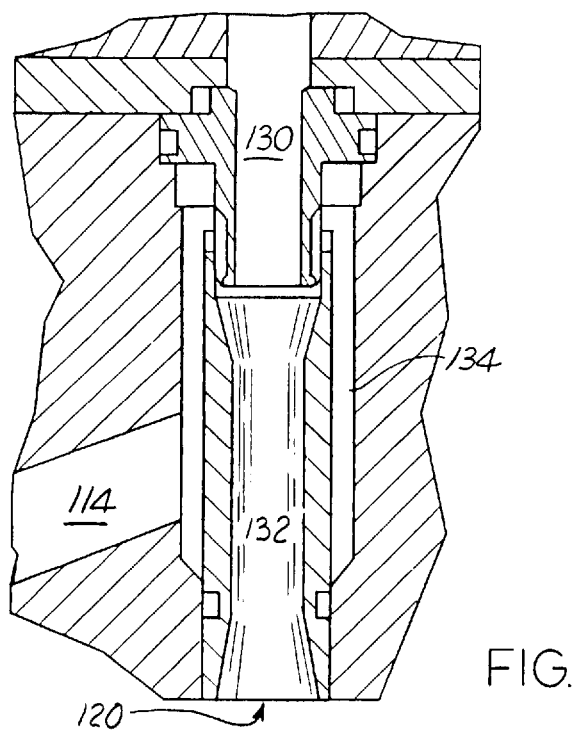
FIG. 12 is a view in vertical section of a transducer first show in FIG. 10 but here shown in comparatively larger scale.
Figure 1:
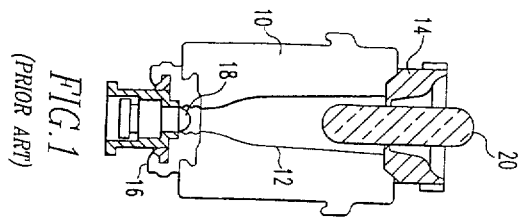
Figure 2:
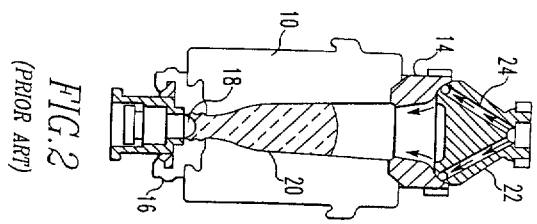
Figure 3:
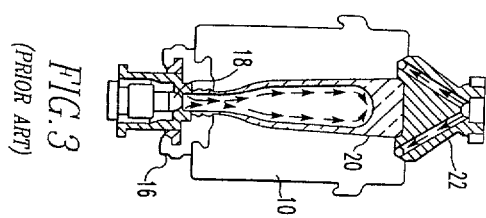
Figure 4:
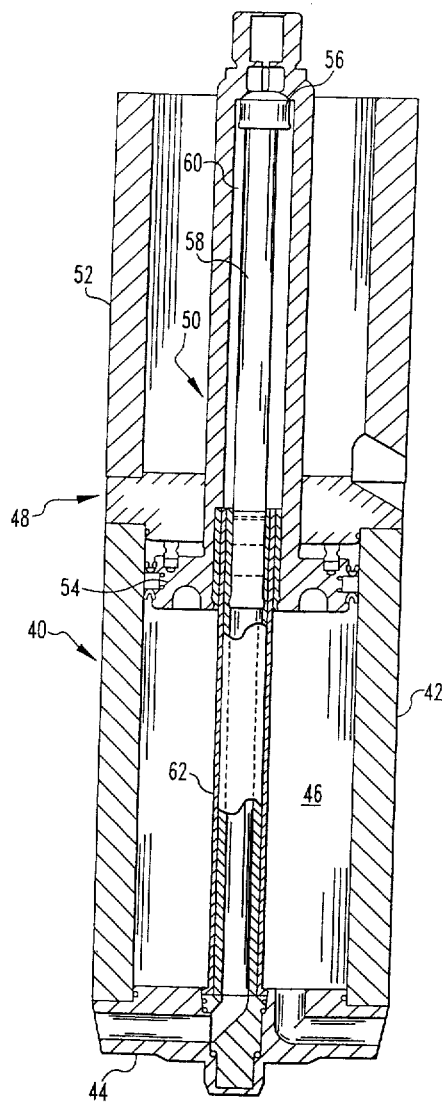
Figure 6:
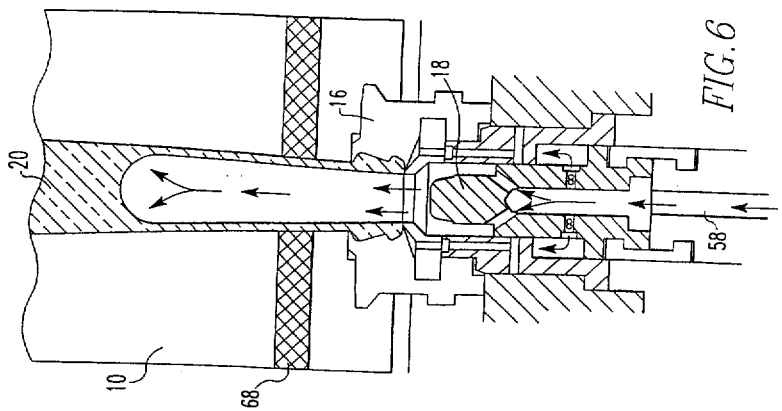
Figure 5:
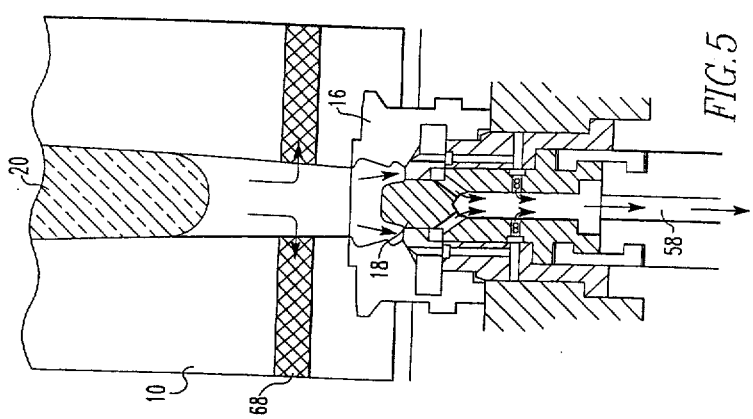
Figure 7:
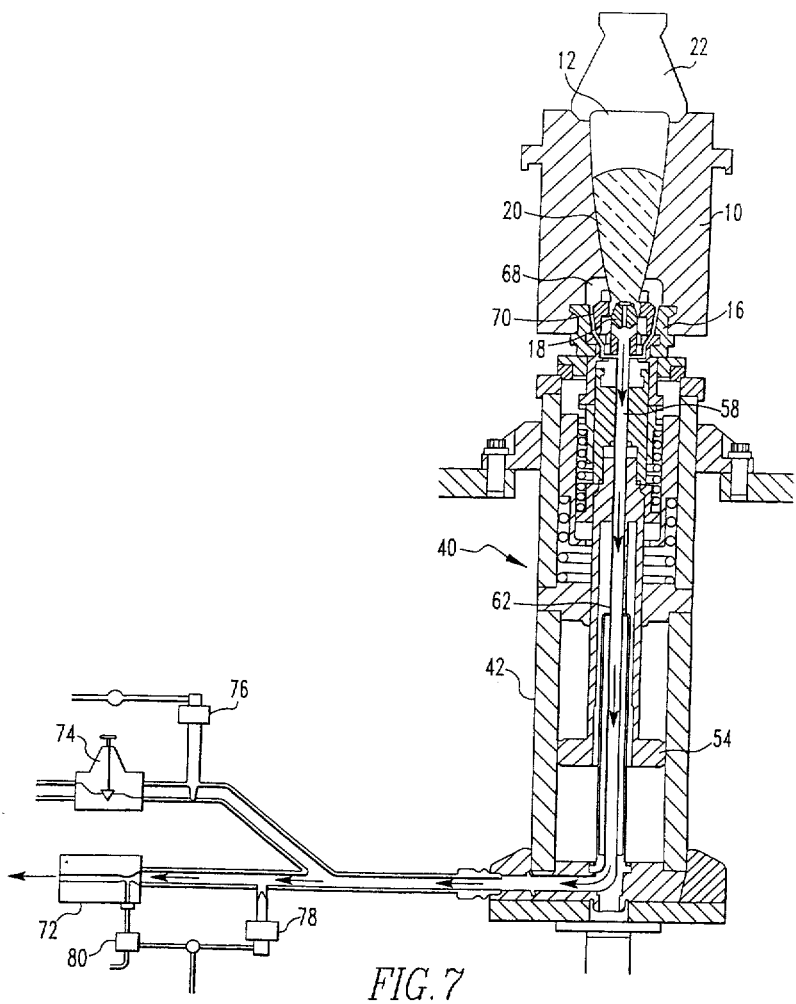
Figure 8:
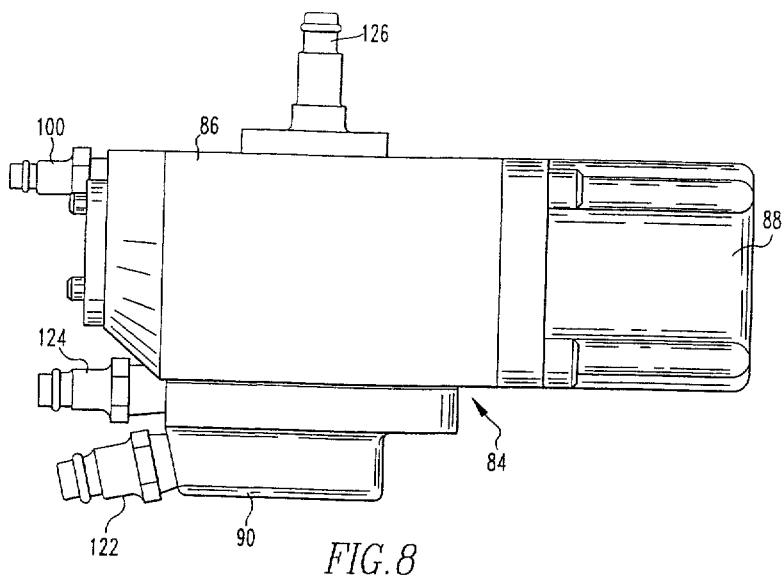
Figure 9:
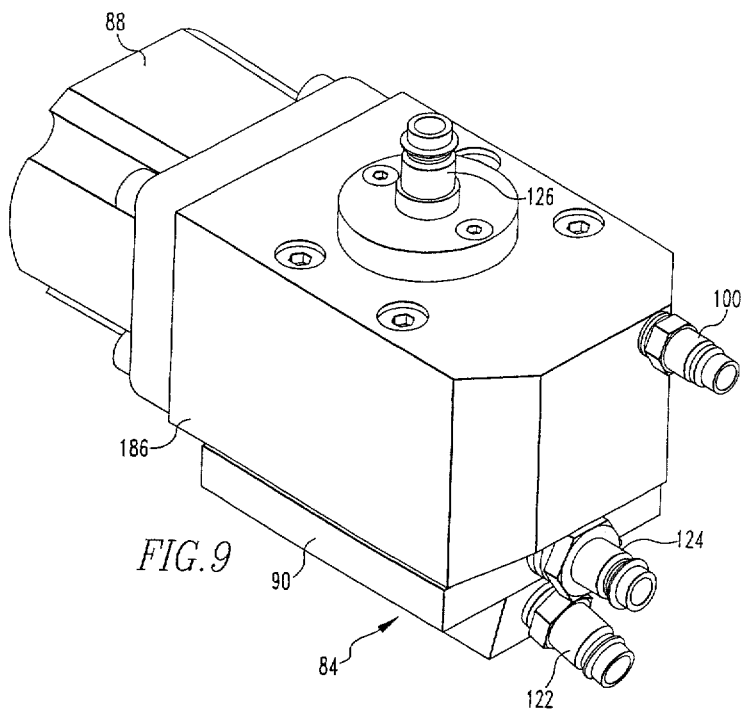
Figure 10:
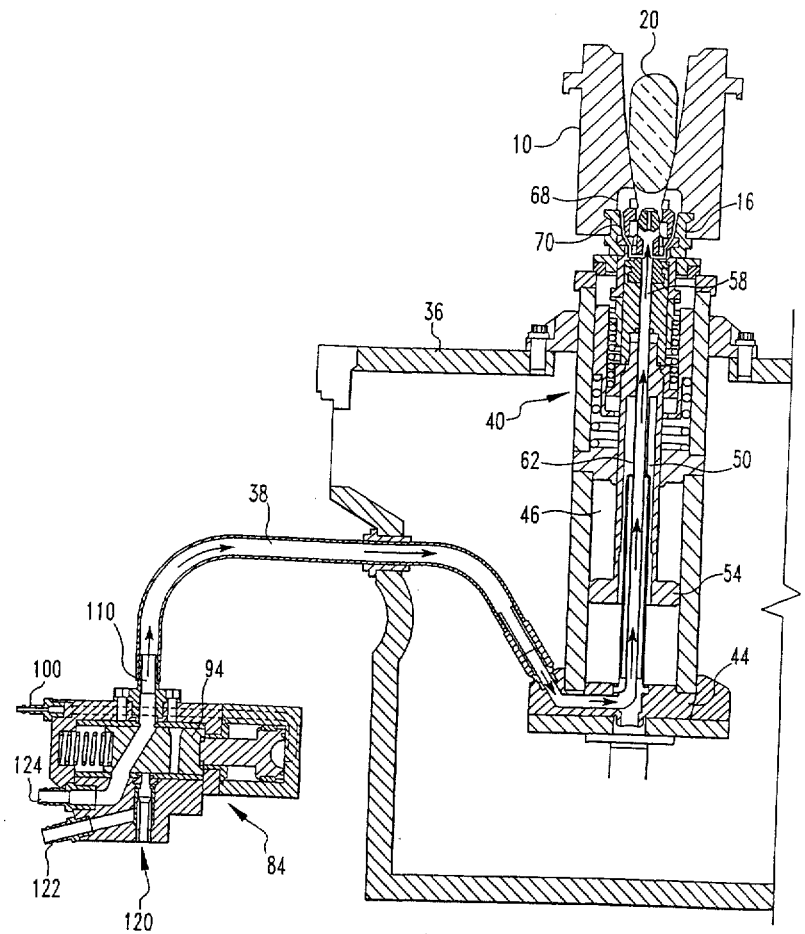
Figure 11:
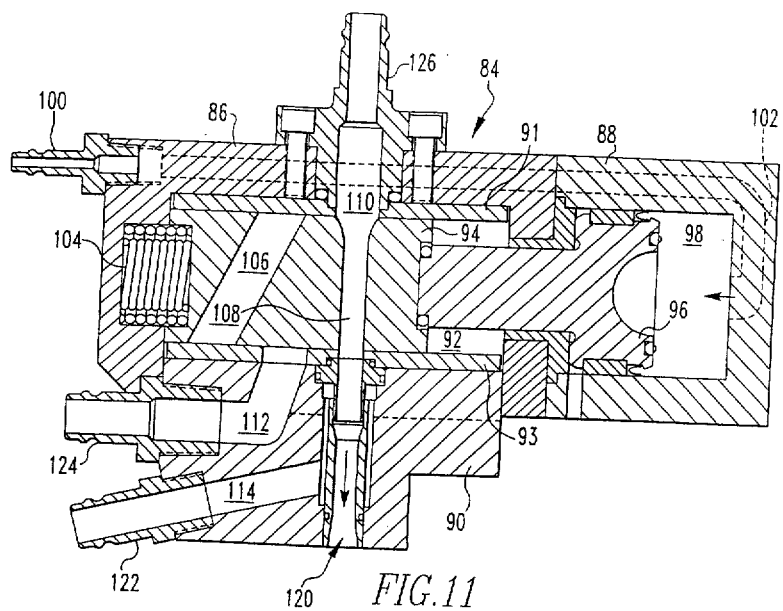
Figure 12:
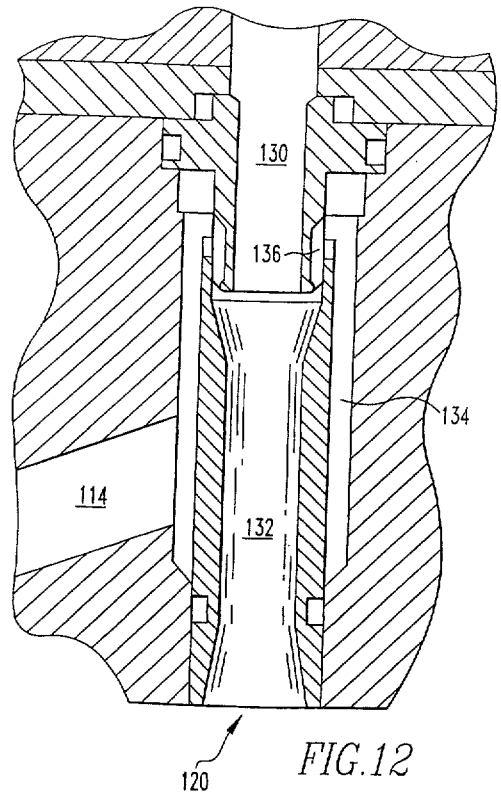

Details of the vacuum transducer are shown in FIG. 12. The transducer has an intake passage 130 leading directly to an outlet barrel 132. A pressurized air flow (preferably 80 pounds per square inch) is directed, during the blow-and-blow process, through entry passage 114 which is coupled to the air supply by proper connection of a female coupler to male coupler 122. The air flow enters an annular manifold-like chamber 134 which directs the flow through an annular restriction 136 whereby the air flow exhausts out through the barrel 132. A venturi effect is created by the increase of velocity of the air flow through restriction 136 whereby a vacuum is drawn within the intake 130. The slide block 94 is positioned between low friction slide plates 91, 93 in the rectilinear chamber of the flow controller. The vacuum which is created through the transducer measures 28.6" (726 mm) mercury by application of the preferred 80 pounds per square inch pressurized air flow to the transducer 120.

Combining the effect of the air flow controller 84 with the tube-within-a-tube structure disclosed in aforementioned U.S. Pat. No. 5,358,543, results in an absolutely clean air passage for counter blow air during the parison forming cycle, preventing accumulation of tramp glass and other debris that plagues more conventional plunger mechanisms in the industry.

Figure 13:
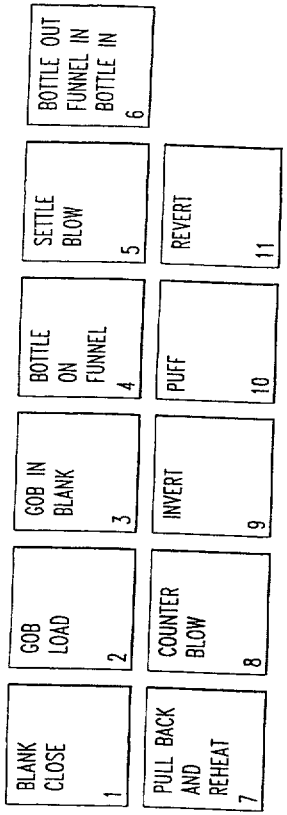
FIG. 13 is a chart lay-out setting forth the steps of the known glass container forming cycle commonly referred to as the blow-and-blow process.
Figure 13:
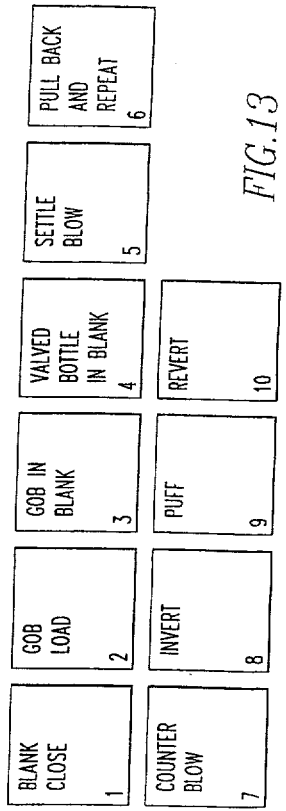
Figure 14:
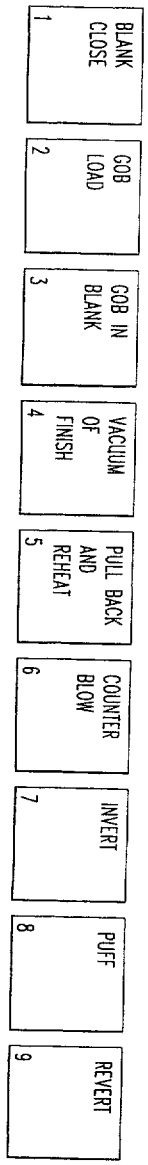
FIG. 14 is a chart layout consistent with the new blow-and-blow process in the practice of the invention herein disclosed.

Comparison of the conventional blow-and-blow process for glass container forming with the improved method provided by the use of the apparatus herein disclosed is provided by comparing FIG. 13 with FIG. 14. As illustrated in FIG. 13, the conventional blow-and-blow process may be conducted with or without the use of a funnel positioned on the blank mold prior to the settle blow step in the cycle. FIG. 14 shows, however, that the blow-and-blow process is significantly altered by shortening the container forming cycle and effectively eliminating the settle blow step. In the blow-and-blow process practiced in accordance with this invention, the container forming cycle may be described as comprising nine discrete steps as identified in FIG. 14 instead of the eleven steps required in the conventional blow-and-blow process wherein a funnel is utilized or the ten steps required with the same process without the funnel, as illustrated in FIG. 13.

By application of the process in accordance with the steps shown in FIG. 14, high quality containers are produced with a new level of consistency and virtual absence of the settle wave effect that is all too familiar in the sidewall structure of containers produced by the conventional blow-and-blow process and without the use of the air flow controller device in combination with the internal tube structure of the plunger mechanism as herein disclosed.

The present invention has been described and illustrated in connection with a presently preferred structural embodiment and the method for its use, however, it is to be understood that other modifications and variations may be resorted to without departing from the spirit and scope of the invention, as those skilled in the art will readily understand. Such modifications and variations are considered to be within the purview and scope of the invention and the appended claims.

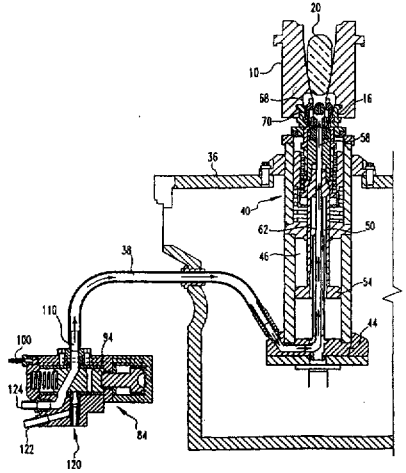

I claim:

1. An air flow control device for applying pressurized positive air flow followed by an exhaust air flow to a mold and through a plunger mechanism to form a glass container from a glass gob, said device comprising:

a closed housing defining a chamber;

a piston disposed to reciprocally move along a linear axis from a first to a second position in the chamber;

first and second passages extending through the piston and across the piston's linear axis;

first and second ports in said housing such that they can be brought into communication with the first passage in the piston when the piston is in its first position;

a third port in said housing such that the first and third ports may be brought into communication by the second passage in the piston when the piston is in the second position;

means to activate the piston to move it between said first and second positions; and a vacuum transducer having an exhaust passage aligned with and in direct communication with the third port and means in communication with said exhaust passage for creating an exhaust air flow through the exhaust passage when pressurized air flow is introduced through said means for creating an exhaust air flow;

whereby exhaust air carrying debris can pass unobstructed through the housing, piston and vacuum transducer.

2. The device of claim 1 wherein said means to activate the piston comprises a first end of the housing having an air inlet for providing a pressurized air flow against an end of the piston to cause it to move from its first position to its second position.

3. The device of claim 2 wherein said means to activate the piston further comprises a biasing means contained in the housing which acts to force the piston from its second position and back to its first position in response to curtailment of the pressurized air flow against the end of the piston.

4. The device according to claim 1 wherein the closed housing comprises a main body portion and a bottom cover portion positionable to form a rectilinear chamber in which the piston in the form of a sliding block fits and for defining said second and third ports.

5. The device according to claim 4 in which low friction slide plates are positioned in the rectilinear chamber on two sides of the sliding block.

6. The device according to claim 4 wherein the vacuum transducer is housed in the bottom cover portion.

7. The device according to claim 1 wherein the vacuum transducer comprises said exhaust passage and means for introducing high velocity air into said exhaust passage intermediate the ends of said exhaust passage through an annular restriction directed away from the first port.

8. A method of forming a glass container by use of glass container forming equipment having a blank mold defining a top end, bottom end and a vertically-elongated cavity therebetween with an open top for permitting a molten glass gob to be loaded downwardly therein and an open bottom end for receiving a vertically-reciprocating plunger mechanism beneath the mold for closing off the bottom end of the cavity, means for applying air pressure at the top end of the mold and passages for evacuating a space at the bottom end of the mold around the periphery of the top of the plunger mechanism when it is closing off the bottom end of the cavity comprising the steps of:

(1) injecting a molten glass gob into the cavity of the mold;

(2) injecting a controlled blast of pressurized air onto the glass gob through the open top to create a pressure drop across the gob and to cause the gob to expand within the mold; and (3) with a vacuum transducer drawing a momentary vacuum between the bottom end of the cavity and the gob to increase the pressure drop across the gob and further to enhance expansion of the gob into the mold and to sweep away debris from the bottom end of the mold and the space at the bottom end of the mold around the plunger mechanism.

9. An air flow control device in combination with glass container forming equipment having a blank mold defining a top end and bottom end and a vertically-elongated cavity with an open top for permitting a molten glass gob to be loaded downwardly therein and an open bottom for receiving a vertically-reciprocating plunger mechanism beneath the mold for closing off the bottom end of the mold, said device comprising:

a closed housing defining a chamber;

a piston disposed to reciprocally move along a linear axis from a first to a second position in the chamber;

first and second oppositely disposed passages extending through the piston and across the piston's linear axis;

first and second oppositely disposed ports in said housing such that they can be brought into communication with the first passage in the piston when the piston is in its first position;

a third port in said housing such that the first and third ports may be brought into communication by the second passage in the piston when the piston is in the second position;

means to activate the piston to move it between said first and second positions; and a vacuum transducer having an exhaust passage aligned with and in direct communication with the third port and means surrounding and in communication with said exhaust passage for creating an exhaust air flow through the exhaust passage when pressurized air flow is introduced through the vacuum transducer;

whereby exhaust air carrying debris can pass directly and unobstructed through the housing, piston and vacuum transducer.

10. A plunger cycling mechanism in a glass container forming machine comprising:

a cylinder casing defining an inner elongated chamber and having a bottom end cap and an opposite upper end;

a piston slidably disposed within the chamber and having an annular base and an upwardly-projecting piston rod coextensive with the chamber axis, the piston rod having a longitudinal bore therein;

the piston rod having a first end fixed to the base, said first end in communication with a longitudinal bore opening in the base and a second end projecting outwardly through an opening in the cylinder's upper end for removable attachment of a plunger thereto;

air tube structure including a first elongated tubular member disposed generally coextensive with the longitudinal bore of the piston rod and defining an annular space between the first elongated tubular member's outer surface and the longitudinal bore of the piston rod;

a second elongated tubular member having a first end secured to the bottom end cap of the cylinder casing and projecting, coextensive with the axis of the cylinder casing, into the annular space such that the second tubular member encompasses the first tubular member when both members are disposed in a down position within the cylinder casing and the first tubular member will telescopically slide within and along the second tubular member when the piston and the piston rod are slidably moved in the cylinder casing;

the first end of the second elongated tubular member being in air flow communication with a source of pressurized air flow;

an air flow controller device disposed between the cylinder casing and a source of pressurized air flow whereby pressurized air flow may be selectively directed through the air flow controller device, said air flow controller device comprising a closed housing defining a chamber;

a piston disposed for reciprocal movement along a linear axis from a first position to a second position within the chamber;

first and second passages extending laterally through the piston and generally across the piston's linear axis;

first and second oppositely-disposed ports in sealed flow communication with the first passage when the piston is in its first position;

a third port in sealed flow communication with the second passage and the first port when the piston is in its second position;

said first port being in air flow communication with the first end of the second elongate tubular member; and a transducer for creating a negative air flow through one of the passages when pressurized air flow is induced through the transducer.

11. A method for use with apparatus for forming a glass container by application of a pressurized air flow into a mold containing a parison, wherein the apparatus includes a plunger and plunger mechanism mounted to have said plunger move in linear reciprocation relative to the mold, said plunger having a central tubing structure, the steps comprising:

(1) applying the pressurized air flow to the mold to press and form the parison;

(2) applying the pressurized air flow in the mold as a counter blow to further shape the parison; and (3) momentarily diverting the pressurized air flow through a transducer in flow communication with the central tubing structure thereby creating a partial vacuum in the central tubing structure.

12. The method of claim 11 comprising the further step of:

(4) timing the pressurized air flow diversion through the transducer to be an incident of the counter blow.

13. In the use of glass container forming equipment having a blank mold defining a vertically-elongated cavity with an open top for permitting a glass gob to be loaded downwardly therein, and an open bottom end for receiving a vertically-reciprocal plunger of a plunger mechanism mounted beneath the mold, an improved blow-and-blow process for forming a parison within the mold, comprising the sequential steps of:

(1) loading the gob into the blank mold;

(2) applying pressurized air downwardly into the mold to force the gob to expand into the mold;

(3) with a vacuum transducer drawing a partial vacuum beneath the gob in the bottom end of the cavity to form the parison from the gob and to sweep debris from the cavity;

(4) retracting the plunger and reheating the cavity and the parison;

(5) applying a counter blow of pressurized air upwardly through the plunger and against the parison to further shape the parison; and (6) inverting the parison from the blank mold.

\* \* \* \* \*

UNITED STATES PATENT AND TRADEMARK OFFICE
CERTIFICATE OF CORRECTION

PATENT NO.   : 5,876,475
DATED        : March 2, 1999
INVENTOR(S)  : Kozora

Page 1 of 13

It is certified that error appears in the above-identified patent and that said Letters Patent is hereby corrected as shown below:

The title page showing the illustrative figure should be deleted to be replaced with the attached title page.

Drawing sheets, consisting of Figs. 1-11, should be deleted to be replaced with the Drawing Sheets, consisting of Figs. 1-11, as shown on the attached page.

TITLE PAGE, end of text, "13 Claims, 7 Drawing Sheets" should read
--13 Claims, 11 Drawing Sheets--.

Signed and Sealed this

Nineteenth Day of December, 2000

Attest:

Q. TODD DICKINSON

*Attesting Officer*          *Commissioner of Patents and Trademarks*

United States Patent [19]
Kozora

[11] Patent Number: 5,876,475
[45] Date of Patent: *Mar. 2, 1999

[54] GLASS CONTAINER FORMING PROCESS AND EQUIPMENT

[75] Inventor: Joseph W. Kozora, Saxonburg, Pa.

[73] Assignee: Quantum Engineered Products, Inc., Saxonburg, Pa.

[*] Notice: This patent issued on a continued prosecution application filed under 37 CFR 1.53(d), and is subject to the twenty year patent term provisions of 35 U.S.C. 154(a)(2).

[21] Appl. No.: 860,281
[22] PCT Filed: Apr. 18, 1997
[86] PCT No.: PCT/US97/06639
   § 371 Date: Jun. 9, 1997
   § 102(e) Date: Jun. 9, 1997
[87] PCT Pub. No.: WO97/39988
   PCT Pub. Date: Oct. 30, 1997

Related U.S. Application Data

[60] Provisional application No. 60/015,342 Apr. 19, 1996.
[51] Int. Cl.⁶ .............................. C03B 9/14; C03B 9/20; C03B 9/36
[52] U.S. Cl. .................... 65/68; 65/72; 65/77; 65/81; 65/261; 65/263; 65/362; 137/625.68; 137/625.48
[58] Field of Search ................ 65/68, 72, 77, 65/78, 81, 233, 234, 261, 263, 362; 137/625.66, 625.68, 625.48

[56] References Cited

U.S. PATENT DOCUMENTS

| | | |
|---|---|---|
| 1,673,747 | 6/1928 | Howard. |
| 2,471,369 | 5/1949 | Garwood. |
| 2,648,168 | 8/1953 | Rowe. |
| 2,826,867 | 3/1958 | Nava, Jr. et al. |
| 2,861,397 | 11/1958 | Morel. |
| 3,171,728 | 3/1965 | Anderson. |
| 3,171,729 | 3/1965 | Anderson. |
| 3,171,732 | 3/1965 | Anderson. |
| 3,258,321 | 6/1966 | Wiley. |
| 3,272,612 | 9/1966 | Hamilton. |
| 4,518,409 | 5/1985 | Monden. |
| 4,657,048 | 4/1987 | Foster. |
| 5,358,543 | 10/1994 | Kozora. |

*Primary Examiner*—Steven P. Griffin
*Attorney, Agent, or Firm*—Webb Ziesenheim Bruening Logsdon Orkin & Hanson, P.C.

[57] ABSTRACT

A method and apparatus for forming a glass container in a blow-and-blow process. The apparatus includes an air flow controller having a housing defining a chamber, a piston disposed for reciprocal movement from a first position to a second position within the housing for moving a slide block therein, first and second passages extending through the slide block, a first port in the housing in flow communication with the second passage and a transducer when the piston is in its second position to create a negative air flow through the second passage and first port when a pressurized air flow is induced through the transducer to draw a vacuum beneath a gob in a blank mold to form a finish in the gob and sweep debris away from the gob and blank mold, and a second port in communication with the first passage and first port when the piston is in its first position to provide pressurized air to the gob.

13 Claims, 7 Drawing Sheets